United States Patent [19]
Green et al.

[11] 3,810,392
[45] May 14, 1974

[54] VEHICLE WHEEL WEIGHT LOCATOR

[76] Inventors: Bernard J. Green, 905 Broad St.;
Milton J. Green, 901 Anderson St.,
both of Bristol, Tenn. 37620

[22] Filed: July 26, 1973

[21] Appl. No.: 382,790

[52] U.S. Cl. .................................. 73/458, 73/487
[51] Int. Cl. ...................... G01m 1/12, G01m 1/16
[58] Field of Search ...................... 73/458, 487, 66

[56] References Cited
UNITED STATES PATENTS
3,272,015  9/1966  Behm ............................. 73/487 X Primary Examiner—James J. Gill

[57] ABSTRACT

A vehicle wheel weight locator for use in positioning single sized weights after determination of the amount of unbalance of the vehicle wheel by a spin balancer. The weight locator having a plate member is secured onto the hub of the spin balancer and aligned by alignment indicia. The reading of the balancer is transferred to the weight locating indicia on the base member to permit single sized weights to be applied to the wheel to correct the unbalance of the wheel.

14 Claims, 3 Drawing Figures

PATENTED MAY 14 1974 3,810,392

VEHICLE WHEEL WEIGHT LOCATOR

This invention relates generally to vehicle wheel weight locators. More particularly the present invention is concerned with an apparatus for use with a vehicle wheel spin balancer that will position balancing weights of a single size around the rim of the vehicle to correct an unbalanced condition.

BACKGROUND

A method of balancing vehicle wheels that is now in substantial commercial use and is the subject of U.S. Pat. No. 3,550,455 avoids the inventory requirements of maintaining different sized weights through the use of a single optimum size. The optimum size has generally been found to be between 0.9 and 1.2 ounces although with the advent of closer tolerances in the manufacture of tires it is believed that the optimum size weight will decrease below 0.9 ounces.

As now commercially practiced substantially all automobile vehicle wheels may be statically balanced on a bubble balancer through the use of a single optimum weight value by first determining the position of the light spot on the wheel assembly placed upon the static balancing apparatus, placing a pair of weights on the wheel rim on either side of the light spot and thereafter moving these pairs symetrically along the rim away from the light spot to effect the static balance of the wheel assembly. The individual weights from each pair are then secured to the inside and outside of the rim to produce a balanced wheel. This method is most effective but is of course limited to the use of a static balancer such as the typical bubble balancer.

One of the best known methods for balancing vehicle wheels, other than that of simply achieving a bubble balance, is through the spin balancer, particularly of the so-called mechanical type. This wheel balancer is attached to the vehicle wheel while in place on the vehicle and the wheel and balancer spun at high speed. Knobs on the balancer permit the balancer to correct the unbalanced condition and indicate what the amount of the unbalance is and where a wheel weight should be located to correct the unbalance. Such a blancer is shown and described in U.S. Pat. Nos. 2,680,974 and 2,723,555.

The amount of the unbalance as determined by the typical spin balancer may be the precise weight within a quarter of an ounce or one-half an ounce and therefore require a vast inventory of various sized weights to meet the requirements of the particular unbalanced wheel. A single sized weight as proposed in U.S. Pat. No. 3,550,455, therefore, could not be utilized at the particular position indicated with the typical spin balancer and expect to correct all unbalanced conditions.

The recognized advantages of the single sized weight were apparent to the users of the spin balancer and the need to meet the special requirements of the spin balancer created the need for a solution to the multi-sized weights heretofore used with spin balancers.

OBJECTS OF INVENTION

It is the principal object of the present invention to provide a weight locator apparatus for use on a vehicle wheel spin balancer.

Another important object of the present invention is the provision of weight locator apparatus which permits the use of a single sized weight on the convention spin balancers.

Another object of the present invention is the provsion of a weight locator apparatus that may be secure to the wheel spin balancer after the spin balancer ha indicated the amount of unbalance in the wheel assem bly.

This invention also has as an object the provision c securing means on the vehicle wheel weight locator t retain its position on the spin balancer.

Another object of the present invention is the provi sion of an alignment means on the weight locator t permit the proper positioning of the weight locator o the spin balancer.

This invention also has as an further object the provi sion of graduated weight locating indicia positione along the rim of the weight locator to indicate the loca tion of the single sized weight to be placed upon the ve hicle in order to correct the unbalanced condition o the wheel assembly.

DESCRIPTION OF PREFERRED EMBODIMENT

Figure 1:
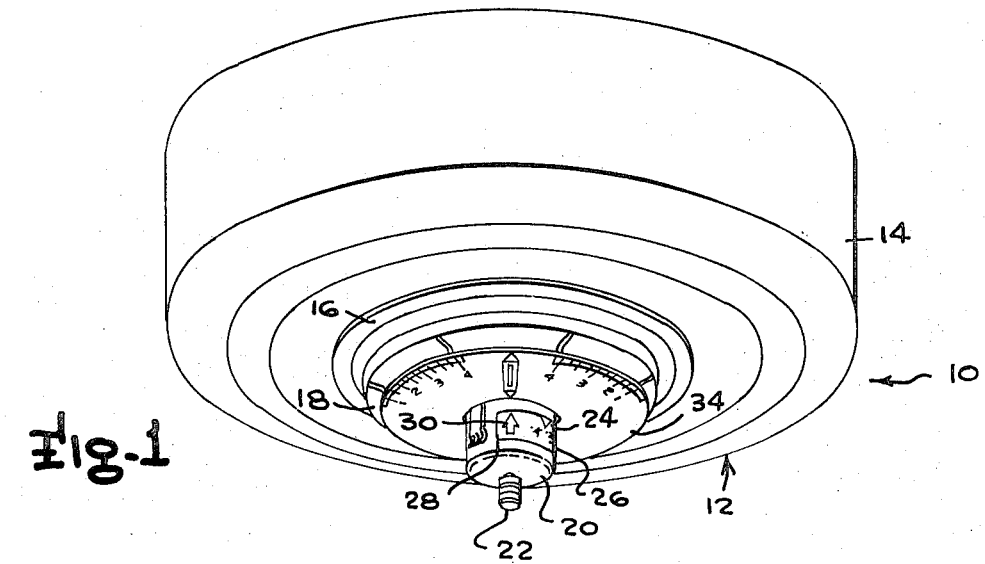
FIG. 1 is a perspective view illustrating the wheel as sembly including the pneumatic tire and tire rim or which is mounted the conventional spin balancer tha receives the wheel weight locator apparatus of the pres ent invention around the hub of the spin balancer.

As illustrated in FIG. 1 at 10, there is shown the wheel assembly 12 which includes the conventional pneumatic tire 14 mounted on the conventional wheel rim 16. In use, the wheel assembly will be mounted on a vehicle not shown in this illustration. Positioned upon the rim and concentric to the wheel assembly is the conventional spin balancer 18 which may be of the type shown and described in U.S. Pat. Nos. 2,680,974 and 2,723,555. This spin balancer is provided with a hub or cage 20 and the usual operating knobs 22 that determine the amount of unbalance in the vehicle wheel assembly. In the operation of the spin balancer, the amount of unbalance in ounces is indicated by the weight pointer 24 indicating the amount of unbalance along the scale 26 both of which are visible through the window 28 in the hub or housing 20. The location on the vehicle wheel rim at which the weight indicated by the weight pointer 24 is to be located is shown by the arrow, 30 visible within the window 28 on the hub 20.

The weight necessary to correct the vehicle wheel as shown by the weight pointer 24 was obtained in accordance with the usual operation of the spin balancer while the wheel assembly with the attached spin balancer was being rotated on the vehicle. The size of the weight necessary to correct the unbalanced condition will vary considerably and may at times be only a fraction of an ounce up to 4, 5 or 6 ounces. Heretofore it was necessary for the operator to maintain an inventory of a number of various sized weights in order to meet the requirements of the unbalanced condition.

Through the use of the weight locator in accordance with the present invention a single sized weight which may be between 0.9 and 1.2 ounces may be utilized. It should be understood that the particular size of the single weight is not critical and may vary from its preferred range. In the practice of the present invention, a weight size of 1.1 ounce has been found particularly advantageous. Accordingly, the weight locator in the present invention as shown in the drawings is scaled and formulated from the preferred weight size of 1.1 ounce.

After the spin balancer has indicated the amount of the weight at 24 to correct the unbalanced condition of the vehicle wheel and the location by arrow 30 of such weight on the vehicle, the present invention comes into operation.

Figure 2:
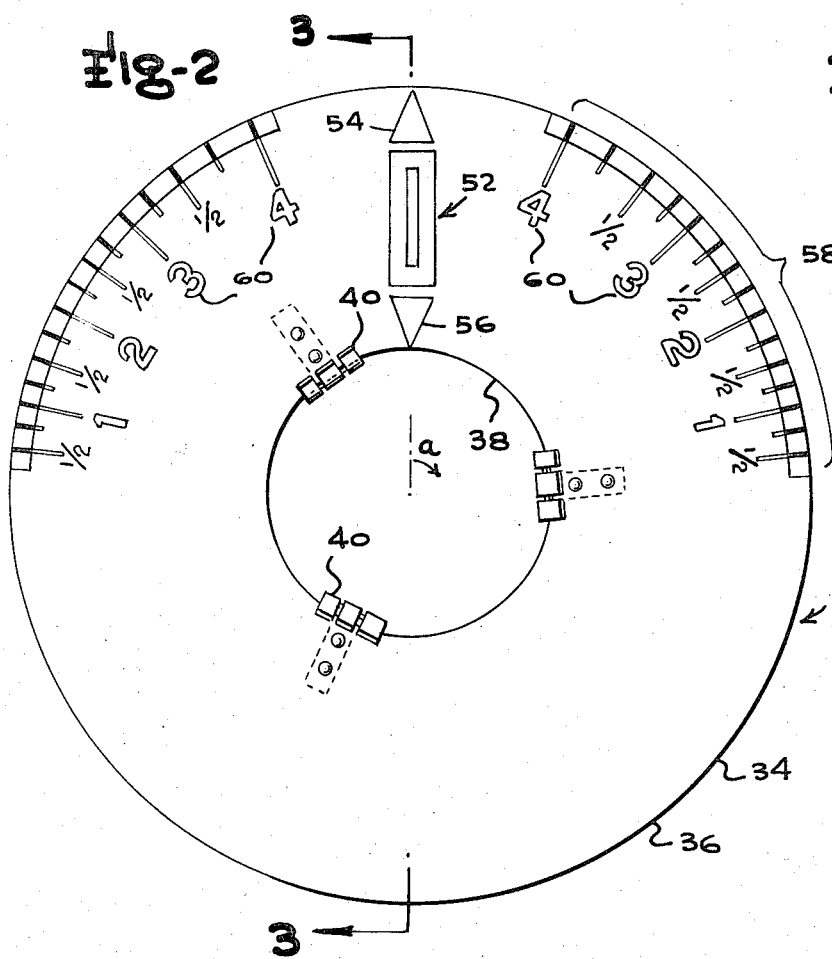
FIG. 2 is a plan view of the weight locator apparatus of the present invention illustrating the alignment indicia and the graduated weight locating indicia spaced along the rim of the locator apparatus.
Figure 3:
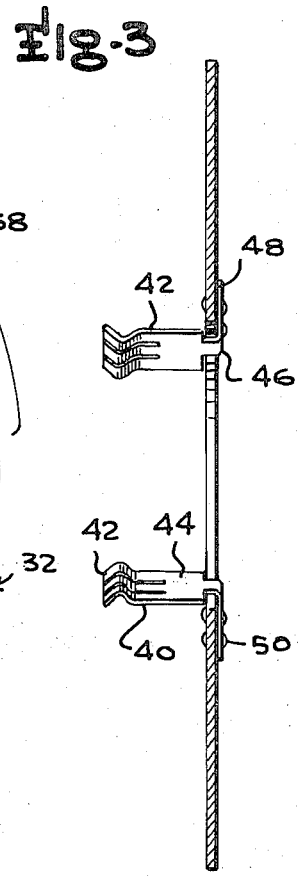
FIG. 3 is a cross-sectional view taken along lines 3—3 of FIG. 2 and illustrating the securing means positioned around the central opening in the plate member.

As best shown in FIG. 2 there is illustrated the weight locator 32 which is formed from a base plate 34 having an outer rim 36 and a central opening 38. As shown the central opening 38 is positioned concentric to the rim 36. Provided on the edge of the central opening 38 is the securing means 40 that may be best seen in FIGS. 2 and 3. The securing means as shown includes a plurality of resilient fingers 42 formed from a resilient band 44, that may be formed from conventional spring metal or plastic material. The hand 44 includes a wrist portion 46 that is bent around the central opening 38 and elongated at 48 to be secured to the underside of the base plate 34 by suitable securing means such as rivets 50. As illustrated, there are three sets of resilient fingers, however the number is not significant, it being only important that sufficient securing means is provided to maintain the weight locator firmly positioned concentrically around the hub 20.

As shown in FIG. 2, the spring fingers when in the unstressed condition are spaced to form a slightly narrower opening than the central opening 38 and slightly less than the diameter of the hub 20. Thus when the weight locator is placed over the spin balancer as in FIG. 1, after spinning the wheel assembly, the spring fingers grasp firmly the outside of the hub to retain the weight locator 32 in proper position for the remaining steps of the operation utilizing the present invention.

The weight locator 32 is provided with an alignment indicia 52 which extends between the central opening 38 and the outer rim 36. The purpose of the alignment indicia 52 is to be aligned with the arrow 30 appearing through the window 28 of the hub 20. The form of the alignment indicia 52 may be an arrow extending between and contiguous to the outer rim 36 and the central opening 38. It is preferred that the alignment indicia be provided with a dual pointer that includes pointer 54 contiguous to the outer rim 36 and pointer 56 contiguous to the central opening 38. The purpose of the dual pointers 54 and 56 forming the alignment indicia 52 is to aid in the alignment of the weight locator with the arrow 30 on the spin balancer with pointer 56 and to point to the light spot on the vehicle wheel with the pointer 54 and to locate the position for additional weights as will be clear hereinafter.

On placement of the weight locator in secure position on the spin balancer with the spring fingers 42 grasping the exterior of the hub 20, the weight locating indicia are shown in FIG. 2 to be symetrically disposed on both sides of the pointer 54. The weight locating indicia can be seen to include the numerical indicia 60, which are disposed on either side of the alignment indicia 52 within the quadrant adjacent the alignment indicia. The numerical indicia 60 are unevenly spaced as illustrated and positioned in accordance with the cosine of the included angle $a$ formed at the center of the central opening between lines passing through the alignment indicia and any one of the numerical indicia. Thus, for instance with the preferred single weight size of 1.1 ounce, the numeral 4 indicates the location on both sides of the alignment indicia 52 wherein the single sized weights are to be located on the vehicle rim. These weights are placed one on the inside and the other on the outside of the rim, at both locations of the numeral 4 in order to have the effectiveness to correct an unbalance of four ounces presumed to be shown by the weight pointer 24.

Since the weights to be applied to the vehicle wheel rim are to be disposed on both the inside and outside of the rim to prevent dynamic unbalance, any weight indicated by the weight pointer 24 on the spin balancer must be placed at the precise location of the weight pointer value equal numerically to the numerical indicia 60 and at that location both on the inside and on the outside of the rim and similarly on the other side of the alignment indicia 52. The weights are then secured to the vehicle rim. The numerical indicia are spaced unevenly in accordance with the cosine of the included angle $a$ and the spacing between adjacent indicia decreases as the effectiveness of the weight to correct the unbalance decreases. The farther the weights are located from the alignment indicia 52 the less the effectiveness of these weights. It should be obvious that the weights located on the vehicle wheel rim will be positioned above the lowest portion of the quadrant to have effectiveness in correcting an out of balance condition.

As shown, any out-of-balance condition up to four ounces indicated by the weight pointer 24 may be corrected with the use of four 1.1 ounce weights in accordance with the particular weight locator 32 shown. If weights of other than 1.1 ounce were to be used the numerical scale spacing of the numerical indicia 60 would be slightly altered in accordance with the new weight value. The positions of each of the particular numerical indicia would be computed in accordance with the cosine values of the included angle.

If the unbalanced condition of the vehicle wheel indicates a weight greater than a pre-selected value such as 4 ounces, the weights are first to be located on the rim on both the inside and outside locations at the position of the alignment indicia 52. Thereafter the vehicle wheel is again balanced through the use of the spin balancer, after removing the weight locator, and the new reading on the weight pointer 24 read. This new reading will be of a lower total weight value due to the previously attached weights that were positioned in the preceding step at the inside and outside of the rim of the vehicle wheel. This new weight value then should be less than 4 ounces. The new single sized weights are then positioned on the inside and outside rim in accordance with the location indicated on the numerical indicia 60 corresponding to the numerical value shown by the weight pointer 24 on the spin balancer, as previously described.

In the event that the weight pointer at any time indicates a weight value greater than the pre-selected 4 ounces, two or more weights in pairs should be placed one of the pair on the inside and the other of the pair on the outside rim at the location shown by the alignment indicia 52 and thereafter the weight locator 32 must be removed before rotating the wheel with the spin balancer to determine the new weight values to be added in accordance with the numerical indicia.

It is recognized that there are various modifications and substitutions that may be made in the present invention all of which are intended to be within the scope of the claims.

We claim:

1. A vehicle wheel weight locator for positioning on a wheel spin balancer comprising:
a plate member,
a central opening in said plate member for receiving the hub of said spin balancer,
securing means positioned around said opening to secure said weight locator to said spin balancer,
an outer rim formed on said plate member and spaced radially outwardly from said central opening,
alignment indicia positioned between said outer rim and said central opening to align said weight locator with said spin balancer, and
weight locating indicia positioned along said rim to indicate the location of a balancing weight to be placed upon the vehicle.

2. The weight locator of claim 1 wherein: said central opening is circular and said rim is concentric to said central opening.

3. The weight locator of claim 1 wherein: said alignment indicia is symetrically positioned between said weight locating indicia.

4. The weight locator of claim 1 wherein: said weight locating indicia are numerical.

5. The weight locator of claim 1 wherein: said weight locating indicia are numerical and unevenly spaced individually relative to adjacent numerical indicia.

6. The weight locator of claim 4 wherein: said weight locating indicia are spaced following the law of the cosine of the included angle between the alignment indicia and the particular numerical weight locating indicia.

7. The weight locator of claim 1 wherein said securing means is resilient.

8. The weight locator of claim 1 wherein: said securing means includes resilient fingers for gripping said hub.

9. The weight locator of claim 1 wherein: said central opening is circular and said rim is concentric to said central opening and said alignment indicia is symetrically positioned between said weight locating indicia.

10. The weight locator of claim 1 wherein: said weight locating indicia are numerical, said weight locating indicia are spaced following the law of the cosine of the included angle between the alignment indicia and the particular numerical weight locating indicia and said securing means is resilient.

11. The weight locator on claim 1 wherein: said central opening is circular and said rim is concentric to said central opening, said alignment indicia is symetrically positioned between said weight locating indicia, said weight locating indicia are numerical, said weight locating indicia are spaced following the law of the cosine of the included angle between the alignment indicia and the particular numerical weight locating indicia and said securing means is resilient.

12. The weight locating of claim 1 wherein: said central opening is circular and said rim is concentric to said central opening, said alignment indicia is symetrically positioned between said weight locating indicia, said weight locating indicia are numerical, said weight locating indicia are spaced following the law of the cosine of the included angle between the alignment indicia and the particular numerical weight locating indicia and said securing means is resilient.

13. The weight locator of claim 1 wherein: the alignment indicia includes a dual pointer means.

14. The weight locator of claim 1 wherein: the dual pointer means includes a first pointer adjacent the outer rim and a second pointer adjacent the central opening.

* * * * *